United States Patent
Kovach et al.

(10) Patent No.: US 8,425,661 B1
(45) Date of Patent: Apr. 23, 2013

(54) MERCURY CAPTURE FOR PACKAGED FLUORESCENT LAMPS

(75) Inventors: J. Louis Kovach, Lewis Center, OH (US); Clinton B. Summers, Westerville, OH (US)

(73) Assignee: VaporLok Technology, LLC, Mankato, MN (US)

( * ) Notice: Subject to any disclaimer, the term of this patent is extended or adjusted under 35 U.S.C. 154(b) by 0 days.

(21) Appl. No.: 13/592,786

(22) Filed: Aug. 23, 2012

Related U.S. Application Data

(60) Provisional application No. 61/564,489, filed on Nov. 29, 2011.

(51) Int. Cl.
*B01D 53/64* (2006.01)

(52) U.S. Cl.
USPC ........... 95/134; 423/210; 252/181.1; 252/184

(58) Field of Classification Search .................... 95/134, 95/901; 96/153, 154; 423/210; 206/418, 206/419; 252/184, 181.1–181.7
See application file for complete search history.

(56) References Cited

U.S. PATENT DOCUMENTS

| | | | |
|---|---|---|---|
| 3,662,523 A | 5/1972 | Revoir | |
| 3,876,393 A | 4/1975 | Kasai | |
| 3,956,458 A * | 5/1976 | Anderson | 423/210 |
| 4,094,777 A | 6/1978 | Sugier | |
| 4,500,327 A | 2/1985 | Nishino | |
| 4,534,944 A * | 8/1985 | Roydhouse | 423/210 |
| 4,708,853 A * | 11/1987 | Matviya et al. | 423/210 |
| 4,917,862 A * | 4/1990 | Kraw et al. | 422/4 |
| 5,478,540 A | 12/1995 | Walles | |
| 5,515,971 A | 5/1996 | Segrest | |
| 7,118,056 B2 | 10/2006 | Domanico | |
| 7,410,054 B2 | 8/2008 | Shatford | |
| 7,923,397 B2 | 4/2011 | Heschel | |
| 8,025,160 B2 | 9/2011 | Wang | |
| 8,168,147 B2 | 5/2012 | Olson | |
| 2004/0074392 A1 | 4/2004 | Choi | |
| 2007/0123660 A1 | 5/2007 | deGouvea-Pinto | |

(Continued)

FOREIGN PATENT DOCUMENTS

WO    WO2009/108220    9/2009

OTHER PUBLICATIONS

Johnson, et al. ("Mercury Vapor Release from Broken Compact Fluorescent Lamps and in Situ Capture by New Nanomaterial Sorbents", Environ. Sci. Technol. 2008, 42, 5772-5778).

"Homocyclic Sulfur Molecules", Plenary Lecture delivered at the 3rd IRIS meeting held in Graz (Austria), Aug. 17-22, 1981.

Beat Meyer, "Elemental Sulfur", Chemical Review, 1976, vol. 76, No. 3, pp. 367-388.

(Continued)

*Primary Examiner* — Frank Lawrence, Jr.
(74) *Attorney, Agent, or Firm* — Mueller Law, LLC; Jerry K. Mueller, Jr.

(57) ABSTRACT

Disclosed is an Hg capture system adapted for advantageous placement within a container housing a fluorescent lamp. Such Hg capture system includes a substrate impregnated with between about 0.08 and 0.23 $g/cm^2$ carbon carrying between about 5% and 15% sulfur, basis carbon weight, reacted with between about 0.02 to about 1% by weight iodine, basis sulfur weight. The corresponding method for scouring released vaporous Hg housed within a container includes providing a source of carbon carrying between about 5% and 15% sulfur, basis carbon weight, reacted with between about 0.02 to about 1% by weight iodine, basis sulfur weight; and placing within the container a substrate bearing an effective amount of the iodine reacted sulfur for scouring Hg released within the container.

10 Claims, 8 Drawing Sheets

U.S. PATENT DOCUMENTS

| | | |
|---|---|---|
| 2009/0095133 A1 | 4/2009 | Maggio |
| 2010/0025302 A1 | 2/2010 | Sato |
| 2011/0049045 A1 | 3/2011 | Hurt |
| 2011/0189065 A1 | 8/2011 | Maggio |
| 2012/0020856 A1 | 1/2012 | Pollack |
| 2012/0097892 A1 | 4/2012 | Mamiya |

OTHER PUBLICATIONS

Ralf Steudel, "Liquid Sulfur", Top Curr Chem (2003) 230:81-116.
Steudel, "Topics in Current Chemistry." vol. 230, Section: Elemental Sulfur and Sulfur-Rich 1-20 Compounds I, Chapter: Liquid Sulfur, published by Springer-Verlag Berlin Heidelberg (2003), p. 93.

* cited by examiner

MERCURY CAPTURE FOR PACKAGED FLUORESCENT LAMPS

CROSS-REFERENCE TO RELATED APPLICATIONS

This application claims benefit of U.S. provisional patent application Ser. No. 61/564,489 filed on Nov. 29, 2011.

STATEMENT REGARDING FEDERALLY SPONSORED RESEARCH

Not applicable.

BACKGROUND

The present disclosure relates generally to the transport of packaged new or spent fluorescent lamps and more particularly to a mercury (Hg) capture system effective to capture vaporous Hg released occasioned by the breaking of such packaged new or spent fluorescent lamps during accumulation and/or transport. The present disclosure also can relate to other devices containing mercury and the transport/storage of elemental Hg.

While fluorescent lamps may be an advantageous choice for energy conservation, their Hg content presents environmental problems for fluorescent lamps whether they are new or spent. Proposed solutions for transporting spent fluorescent lamps include U.S. Pat. No. 7,631,758 ("the '758 patent", the disclosure of which is expressly incorporated herein by reference), which describes an inner box, an intermediate vapor resistant bag that includes a laminate of foil, and an outer box. Not addressed in this packaging system is the capture and containment of released Hg caused by the breaking of such packaged transported fluorescent lamps using a recyclable adsorbent.

Prior proposals for the capture of released Hg include US Pub. No. 2008/0312489, which proposes the use of sulfur to capture released Hg from broken fluorescent lamps. US Pub. No. 2007/0123660 proposes the use of a binding ligand (e.g., cysteine) and an ionic liquid (e.g., alky-3-methylimidazolium cation) adsorbed on a substrate (e.g., silica) for the capture of mercury, lead, zinc, and cadmium. US Pub. No. 2007/0140940 proposes to remove Hg from flue gas from a coal-burning power utility using oxidative sorbents including silicates bearing oxidative metal halides and/or sulfates. Johnson, et al. ("Mercury Vapor Release from Broken Compact Fluorescent Lamps and In Situ Capture by New Nanomaterial Sorbents", *Environ. Sci. Technol.* 2008, 42, 5772-5778) propose the use of toxic nano-selenium for the capture of Hg released from broken fluorescent lamps. U.S. Pat. No. 7,410,054 proposes the use of sulfur-impregnated carbon paper, a desiccant package of sulfur-impregnated activated carbon particles, or a strip of sulfur chalk for the capture of Hg released from broken fluorescent lamps.

BRIEF SUMMARY

The current disclosure is an Hg capture system adapted for advantageous placement within an inner box housing a fluorescent tube as a source of Hg, such as by adhering the Hg capture system to the inner box. Such Hg capture system includes, inter alia, a pad having carbon particles bearing a reacted iodine (e.g., $I_2$ or $KI_3$) sulfur compound.

The pad can be adhered to the interior of the box housing the fluorescent lamp(s) using, for example, chemical means (e.g., an adhesive, especially a releasable adhesive) or mechanical means. As noted above, if a classic cardboard box is used virtually an interior surface is suitable for bearing the pads. About 645 $cm^2$ of impregnated pad may be useful for a container of 1.2 m fluorescent lamps.

Specifically, disclosed is a method for scouring released Hg housed within a container. Such method provides a source, e.g., a substrate impregnated with about 0.08 and 0.23 g carbon per square centimeter, carrying about 5% to 15% sulfur, based on carbon weight, reacted with about 0.02 to about 1% by weight iodine, based on sulfur weight. The substrate is placed within the container; wherein the substrate bears an effective amount of the iodine/sulfur compound for scouring released vaporous Hg within the container. Additional iodine can be provided at the consequent extra expense of excess iodine, but the system works just as described.

In a broader sense, the disclosed Hg capture system can be used in any situation where Hg capture or scouring is wanted and/or needed. Thus, for any container in which Hg may be released (inadvertently or deliberately) and its capture is required or desired, the disclosed Hg capture system has application. Also with different containers (say, and including stand-alone bags or pouches) different methods of adhering the pads may be required. Such alternative means of adhering the pads to boxes also may be needed and/or desired.

A distinct advantage of the present system is the ability to readily handle the spent pads for thermally reclaiming the captured Hg.

BRIEF DESCRIPTION OF THE DRAWINGS

For a fuller understanding of the nature and advantages of the present Hg capture system, reference should be had to the following detailed description taken in connection with the accompanying drawings, in which.

Figure 1:
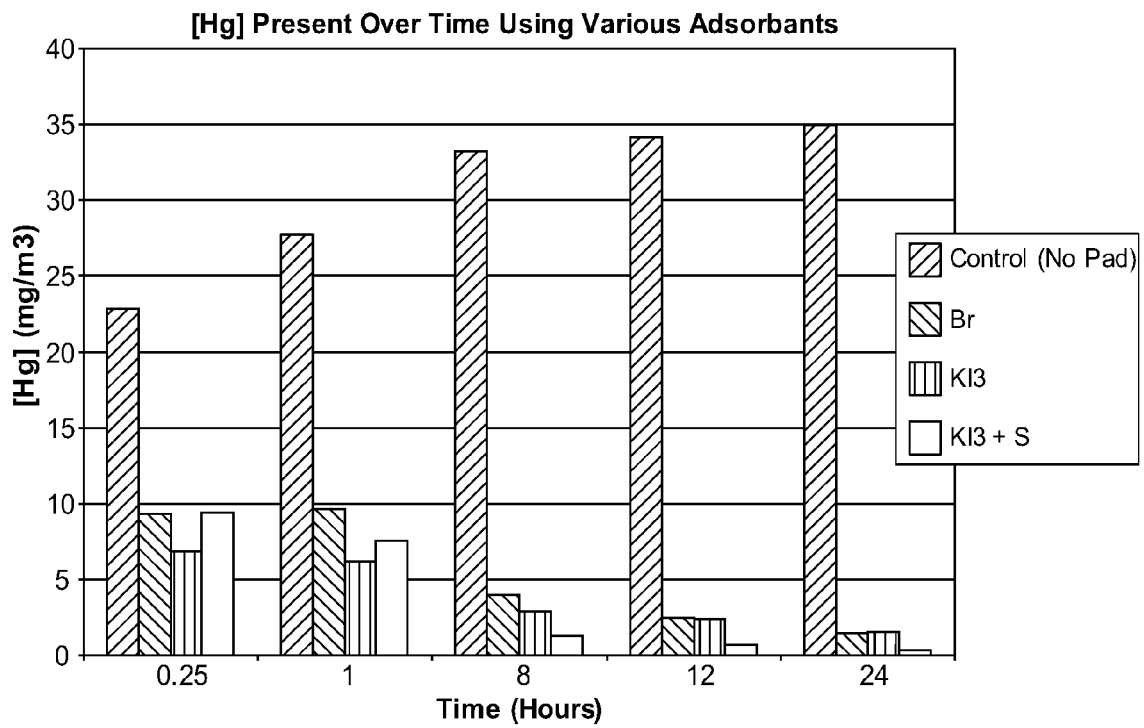
FIG. 1 is a bar graph of Hg concentration ($mg/m^3$) versus time (hours for various candidate Hg absorbents.

These drawings will be described in further detail below in connection with the working examples.

DETAILED DESCRIPTION

While the disclosed Hg adsorbent system is designed for use with the packaging system disclosed in the '758 patent, it can be used to advantage for Hg scouring regardless of the packaging system, as the disclosed Hg adsorbent system is effective in Hg remediation regardless of the environment in which the vaporous Hg is released. For that matter the disclosed Hg adsorbent system may be useful in a liquid system or in a coating for Hg remediation. Again, while the disclosed Hg adsorbent system is designed for Hg capture from broken fluorescent lamps (or tubes), it is effective for Hg capture regardless of the source of released Hg. The disclosed Hg adsorbent system, then, will be illustrated with specific reference to fluorescent light lamps and specific reference to the '758 packaging system; however, such illustrations are not limitative of the disclosed Hg adsorbent method and system.

Sulfur is normally in a polymeric form, consisting of $S_6$, $S_8$ and often even larger numbers of sulfur atoms. It also is common for sulfur to form cyclic compounds consisting of up to 20 S atoms. The measurement of viscosity of the molten sulfur is a good indicator of the degree of polymerization. Naturally, these polymers are less reactive in the middle of the chain than at the terminating atoms. It was found that the addition of small amounts of halogens (chlorine, bromine, iodine) blocks the end atoms of short chain sulfur compounds and even minute amounts lower the viscosity dramatically. For example, the addition of 0.02% of iodine gives a viscosity maximum of only 5.7 Pa at 225° C. [Ralf Steudel, "Liquid Sulfur", Top Curr Chem (2003) 230:81-116]. It is generally assumed that the halogens react to form short-chain dihalopolysulfanes, $S_nX_2$. The reduction in the chain length of the polymeric sulfur molecules results in the lowered viscosity. Additionally, formation of the dihalopolysulfanes prevents reactions that would allow the formation of homocyclic sulfur rings, which can reduce the availability of terminal sulfur atoms for reaction with mercury.

The key feature of this novel adsorbent system is the chemical reaction of a halogen (in this case iodine) with the sulfur prior to impregnation of the adsorbent material (activated carbon). This chemical reaction results in short, linear sulfur chains with halide atoms attached, preventing polymerization or cyclization of sulfur chains. While sulfur and halogens are both known to react with mercury and are described in prior arts, sulfur reacted with halogens that does not re-polymerize or form homocyclic rings maintains superior kinetics and capacity due to increased reactive sites (both sulfur and halogen) and more reactive sulfur atoms present in the short chains.

Since these reactions are reversible, the volatility of both the formed low-mass dihalopolysulfanes and the halogen are important parameters to consider for the stability of the formed compound. Sulfur reacted with iodine shows the greatest decrease in viscosity, demonstrates the lowest volatility, and most significantly was found to also improve the reactivity of the iodine-reacted sulfur towards mercury. This to be expected as the shorter sulfur chains would provide more reactive sites than long sulfur chains or cyclic sulfur molecules.

The iodine-reacted sulfur compound is formed at relatively low temperatures ranging from about 120° C. on up to about 150° C. These are mild temperatures compared to the art that uses 600° C. to form short chain sulfur allotropes.

What has been found is that the addition very small quantity of halogens, particularly iodine, to the sulfur, which is deposited on an adsorbent, such as, activated carbon, improves the mercury removal properties of the final product. This is particularly true at very low mercury concentrations. While iodine is found to be the optimum halogen for the sulfur chain shortening process, other halogens such as chlorine, bromine, or sulfur chloride also can have similar effects.

The amount of iodine typically required in the disclosed Hg adsorbent system for broken fluorescent lamps, say up around 1.2 m (4 feet) in length, ranges from about 0.02 to about 1% by weight iodine (based on sulfur weight) reacted with the sulfur and adsorbed onto, say, powdered carbon. The finer the carbon particle size, the greater the surface area for Hg contact and, therefore gas diffusion to and into the treated carbon grains. The iodine can be supplied in various forms. $I_2$ or $KI_3$ have been found to perform for present purposes, although it is recognized that other iodine compounds capable of iodizing the sulfur molecules (e.g., ICl) can be used to advantage. The type of powdered activated carbon is unimportant so long as it can bind the iodine treated sulfur for vaporous Hg capture. Carbon particles in size where 95% of the particle are less than 45 μm are useful in the disclosed system and process.

The iodized sulfur impregnated powdered carbon can be carried by cloth, paper, or any other convenient substrate. An advantageous substrate is cloth of polymeric, cotton fiber, or any other thread. An open structure is desired for maximizing adsorbent composition contact surface area. Such open structure can include virtually any type of weave or non-woven fibrous material.

Figure 15A:
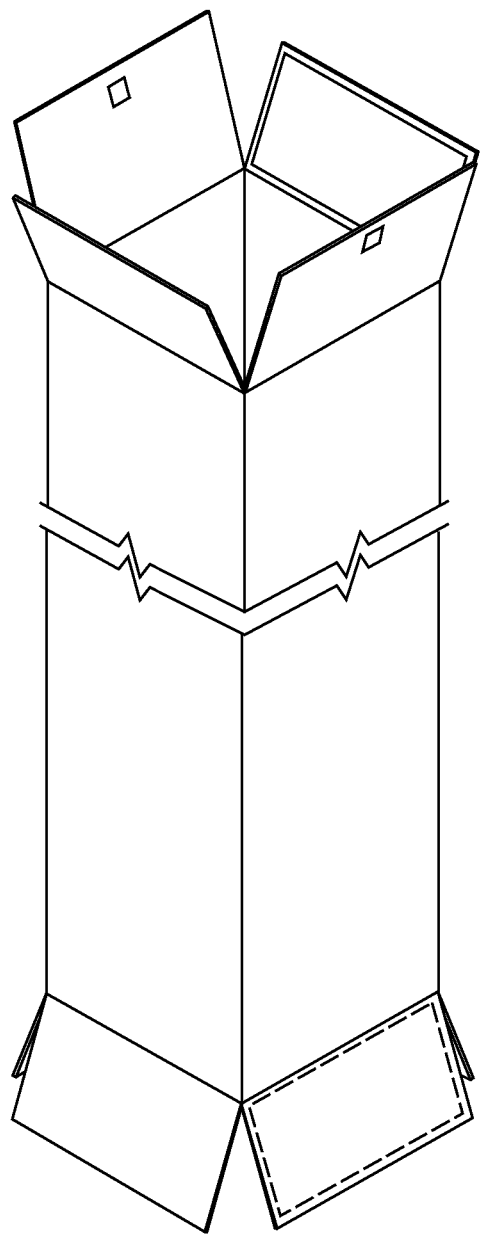
FIG. 15 is a plan view of a box having fold-over end flaps the disclosed adsorbent being affixed to two of the end flaps that confront the box interior volume when the flaps are folded over for sealing the box.
Figure 15B:
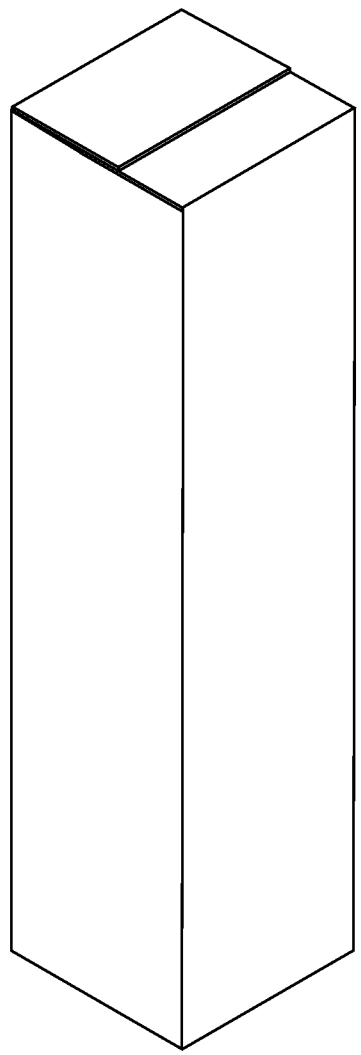

The packaging system of the '758 patent can admit up to, say, 146 T-8 1.2 m fluorescent lamps for transport; although, packaging size can be varied for a lesser or greater number of new or spent lamps. Since common commercial cardboard boxes have 4 flaps at each end for closure, the two innermost folded flaps are convenient locations to adhere the adsorbent (see FIG. 15). The impregnated carbon substrate can be conveniently adhered to the flaps with releasable adherent. It should be recognized, however, that other means of attachment (e.g. VELCRO, a die-cut notch, or the like could be used to advantage.

Another convenient location for the placement of the impregnated carbon substrate is inside the inner cardboard (or other packaging material) box housing the lamp-filled bag. In other contexts, a bag of small grain similarly (i.e., iodized sulfur) impregnated carbon may be used to advantage. Broadly, the impregnated substrate is chemically or mechanically secured to the container.

It should be recognized; however, that placement of additional adsorbent in multiple locations within the box maximizes the opportunity for the released Hg to come into contact for its scouring. There is a tradeoff of how much and how fast the Hg is scoured versus cost in additional adsorbent and labor for its placement. The present disclosed Hg scouring system is flexible and powerful in allowing commercial operators and/or regulators to determine rate and completeness of Hg removal.

Upon arrival at the recycling facility, the lamp transport containers are subject to removal and acceptable recycling/ disposal in accordance with accepted procedures and regulations. The adsorbent pads can be readily removed from the boxes since they advantageously were adhered with removable adhesive. The pads, then, can be subject to treatment for recovery of the Hg content held by the adsorbent carried by the carbon-impregnated pads. Such recycled and reclaimed Hg can be reused for manufacture of additional fluorescent tubes or other commercial uses. The carbon also can be recycled for additional uses, as can the substrate or pads. Such spent pads also can be disposed of in acceptable manner.

Alternatively, the recovered pads can be sent to a landfill for disposal, inasmuch as the Hg toxicity characteristic leaching procedure, or TCLP (EPA Method 1311), was determined to be 0.0530 mg/L (EPA Test Method 7471 for Hg determinations in the leachate). The allowable limit set by the US EPA for Hg is 0.2 mg/L.

The following examples show how the present invention has been practiced, but should not be construed as limiting.

EXAMPLES

Example 1

Various adsorbents were tested for their ability to capture released Hg, such as would be released from a broken fluorescent lamp. A polyester fiber pad containing 0.105 g/cm$^2$ of carbon was impregnated with 3 different candidate adsorbent agents, as follows: Br (8%), $KI_3$ (8% I), S (8%), and $KI_3$ reacted S (1% I and 8% S), all percentages based on the carbon weight. A control with no adsorbent also was run. The amount of Hg present over time (i.e., not captured) was recorded over time post Hg release. The results recorded are displayed in FIGS. 1-9.

Figure 2:
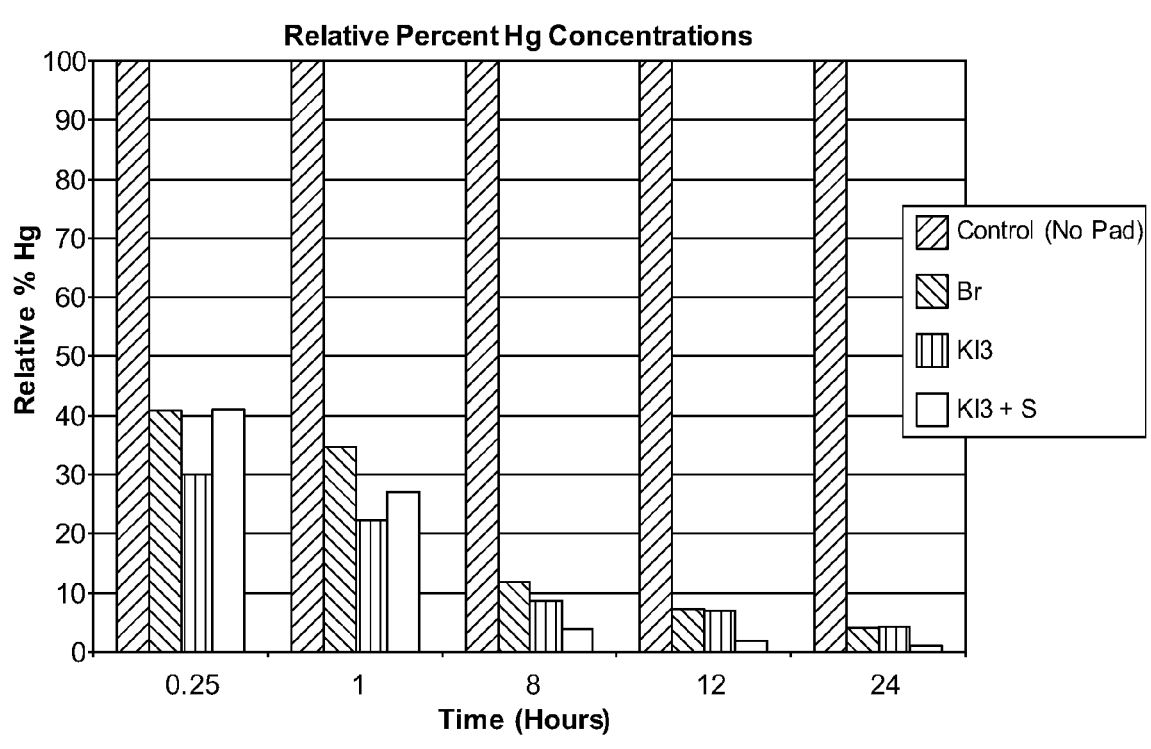
FIG. 2 is a bar graph of relative percent of Hg concentrations over time versus time (hours) for the same candidates evaluated in FIG. 1.

FIG. 1 shows Hg concentration in mass units (mg/m$^3$) at 0.25, 1, 8, 12, 24 hours post Hg release. FIG. 2 shows Hg in relative % of Hg basis control. Both of these bar graphs show that each candidate evaluated was capable of removing Hg. The $KI_3$ reacted S combination shows the best results.

Figure 4:
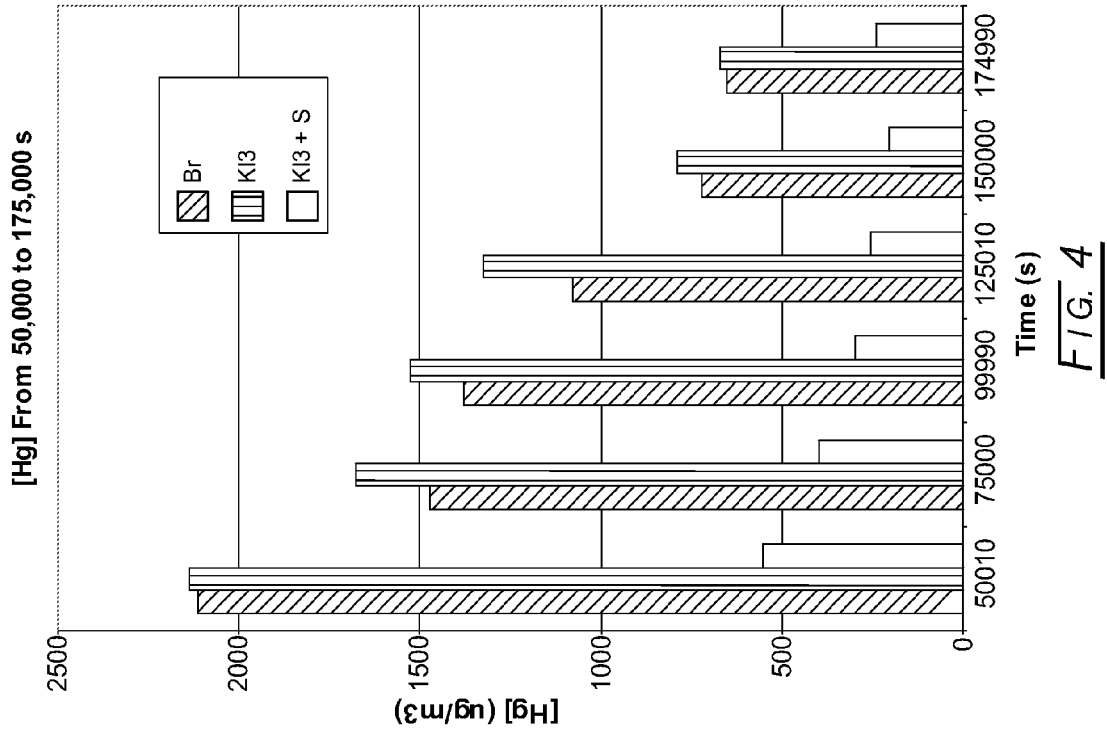
FIG. 4 is a bar graph of Hg concentration ($\mu g/m^3$) from 50,000 to 175,000 sec; for the same candidates evaluated in FIG. 1.
Figure 3:
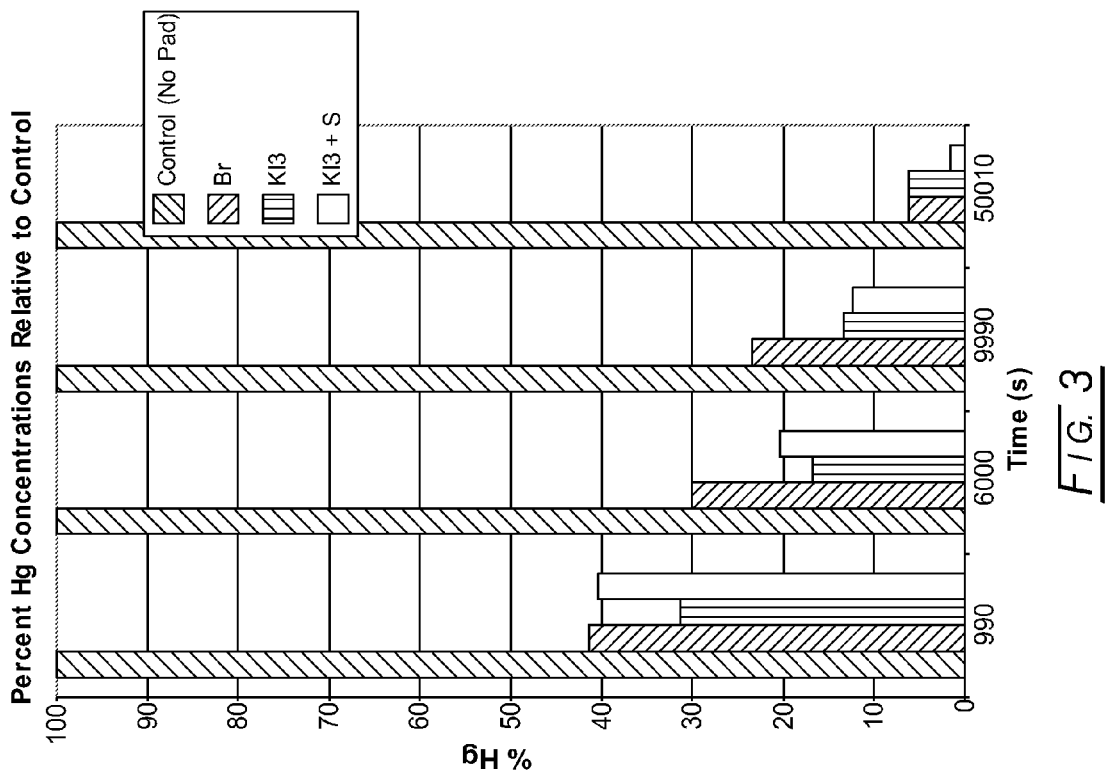
FIG. 3 is a bar graph of % Hg relative to a control versus time (sec) between 990 and 50,010 seconds for the same candidates evaluated in FIG. 1.
Figure 6:
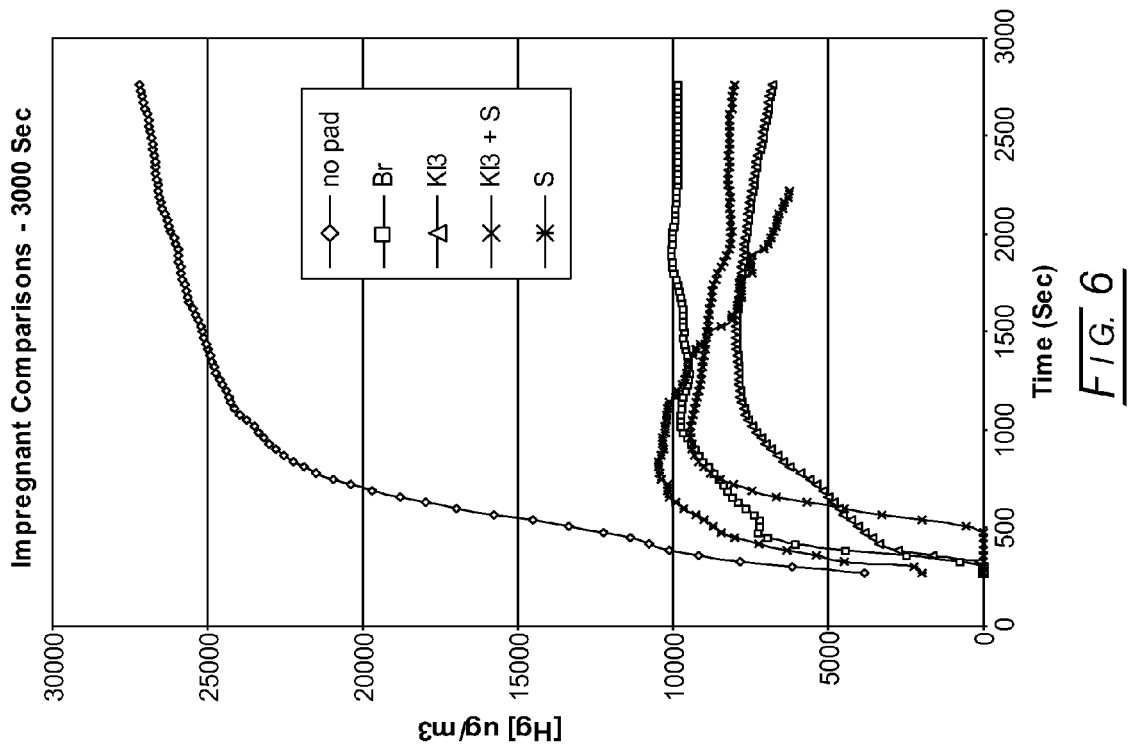
FIG. 6 is a plot of Hg concentration ($\mu g/m^3$) from 0 to 3,000 sec; for the same candidates evaluated in FIG. 1.
Figure 5:
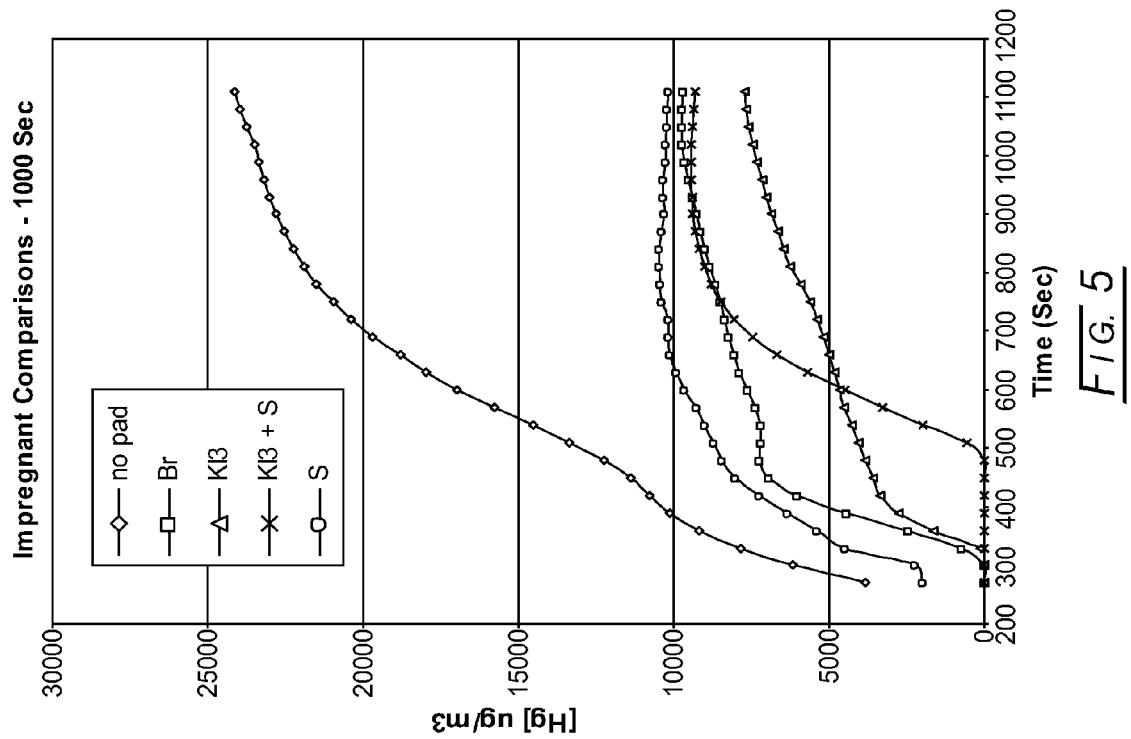
FIG. 5 is a plot of Hg concentration ($\mu g/m^3$) from 200 to 1200 sec; for the same candidates evaluated in FIG. 1.
Figure 8:
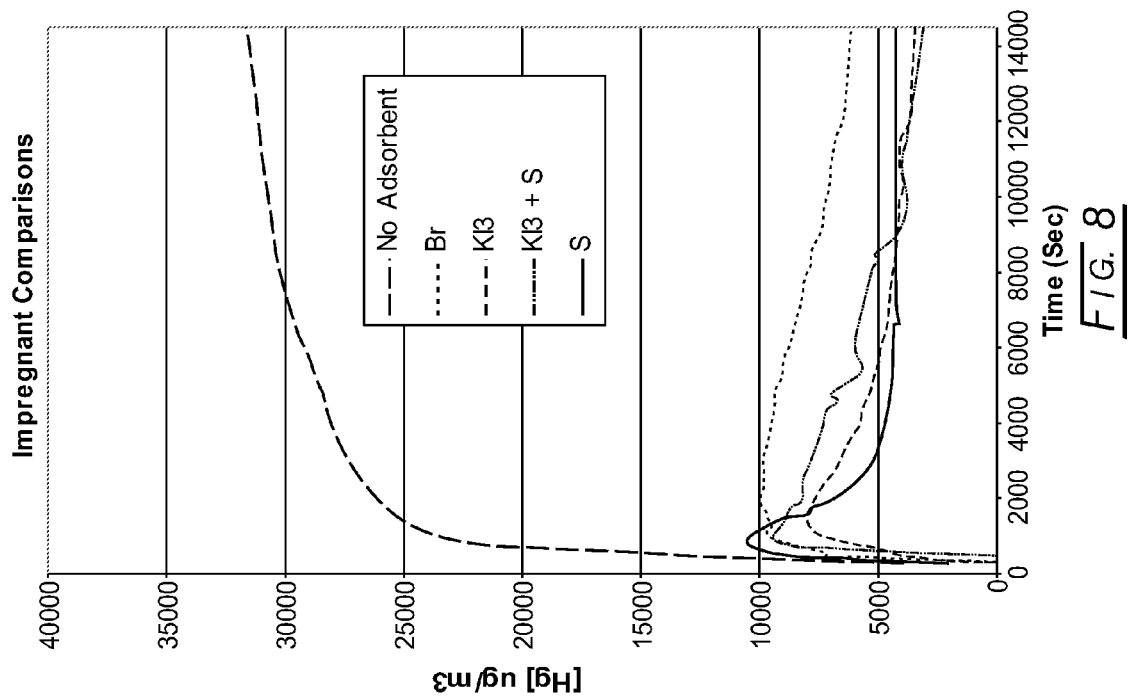
FIG. 8 is a plot of Hg concentration ($\mu g/m^3$) from 0 to 14,000 sec; for the same candidates evaluated in FIG. 1.
Figure 7:
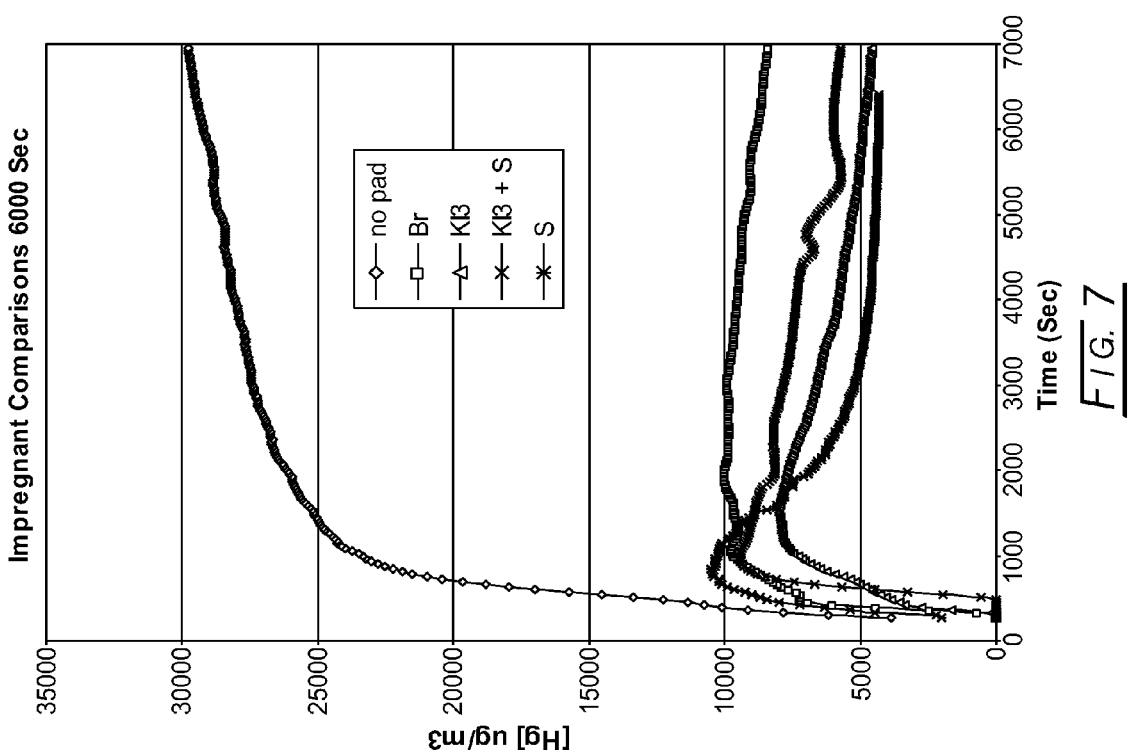
FIG. 7 is a plot of Hg concentration ($\mu g/m^3$) from 0 to 7,000 sec; for the same candidates evaluated in FIG. 1.

FIGS. 3 and 4 are bar graphs displaying the results up 48 hours post Hg release. At long times post Hg release, the $KI_3$ reacted S combination is substantially better than the other candidates. The answer to the question, then, is that the results recorded indeed are significant for the $KI_3$ reacted S combination.

Figure 9:
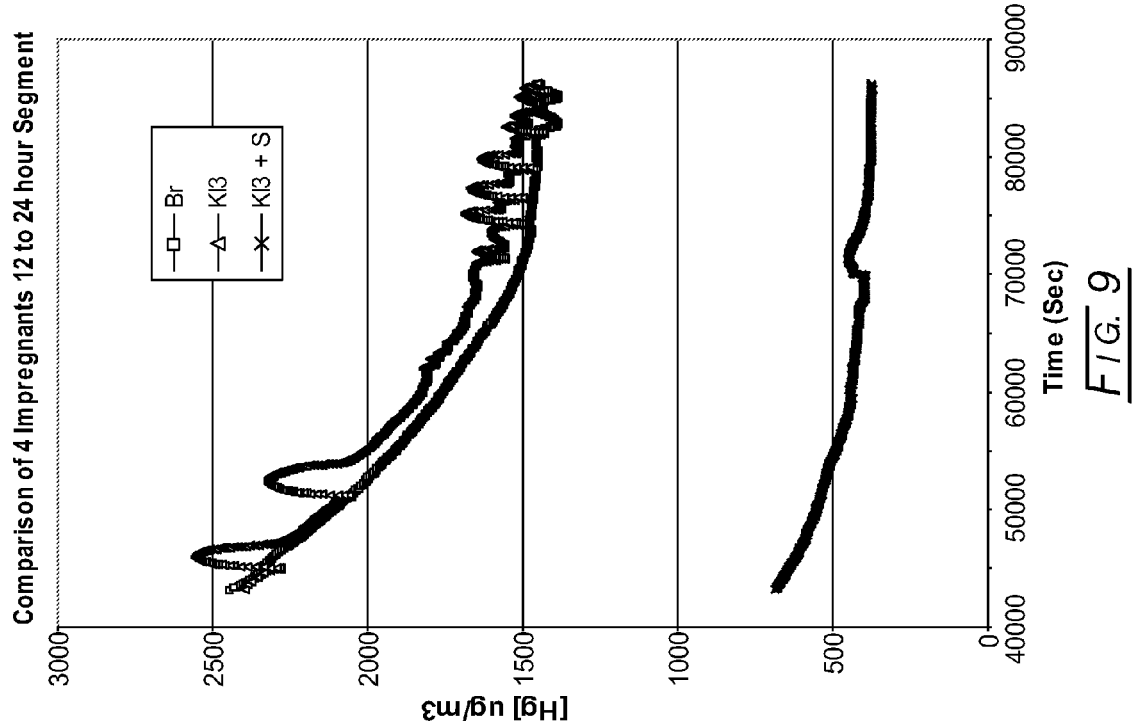
FIG. 9 is a plot of Hg concentration ($\mu g/m^3$) from 40,000 to 90,000 sec; for the same candidates evaluated in FIG. 1.

FIGS. 5-9 are plots of the same data in mass units, each successive figure showing ever increasing times post Hg release up to 25 hours. FIG. 9 really shows the difference in the candidate adsorbents and clearly shows the superiority of $KI_3$ reacted S combination.

While each of the adsorbents evaluated are capable of removing released Hg, the $KI_3$ reacted S combination provided to be the most effective in scavenging released Hg.

Example 2

40 fluorescent lamps were placed into the inner box and the foil/poly bag of a LampTracker® Mercury VaporLok® assembly, as described in the '758 patent, and sealed shut. The bag assembly then was placed in a control chamber. Sample ports were installed to monitor Hg concentrations inside the foil/poly barrier surrounding the inner box, post breakage of the lamps. Additionally, the concentration of Hg escaping the inner box and foil/poly barrier was monitored.

Figure 10:
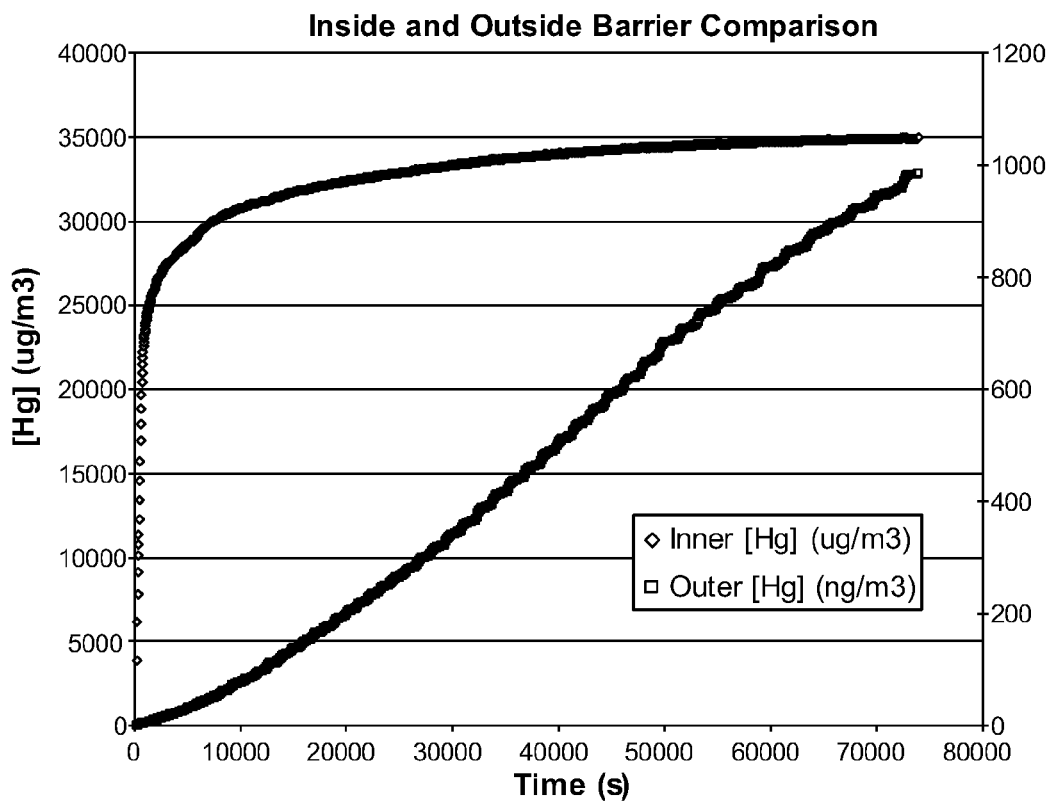
FIG. 10 plots Hg concentration ($\mu g/m^3$) versus time (sec) inside the barrier and outside the barrier when no adsorbent is used.

The results recorded are displayed in FIG. 10. The amount of measured released Hg inside the bag rose quickly post lamp failure to about 35,000 μg/m$^3$ of Hg (see left scale). Hg escaped from the bag rose more slowly to only about 1000 ng/m$^3$ at around 70,000 seconds (see right scale). Note the scale unit difference: μg versus ng. Although the Hg vapor escape from the package is minimal (1,000 mg/m$^3$ is 100 times less than the OSHA 8-hour TLV), these results establish the need for use of an effective Hg adsorbent system housed within the bag in order to prevent Hg escape to the atmosphere from the inadvertent or deliberate opening of the package or leakage from the bag if not sealed properly or if vapor resistant barrier is not used.

Figure 11:
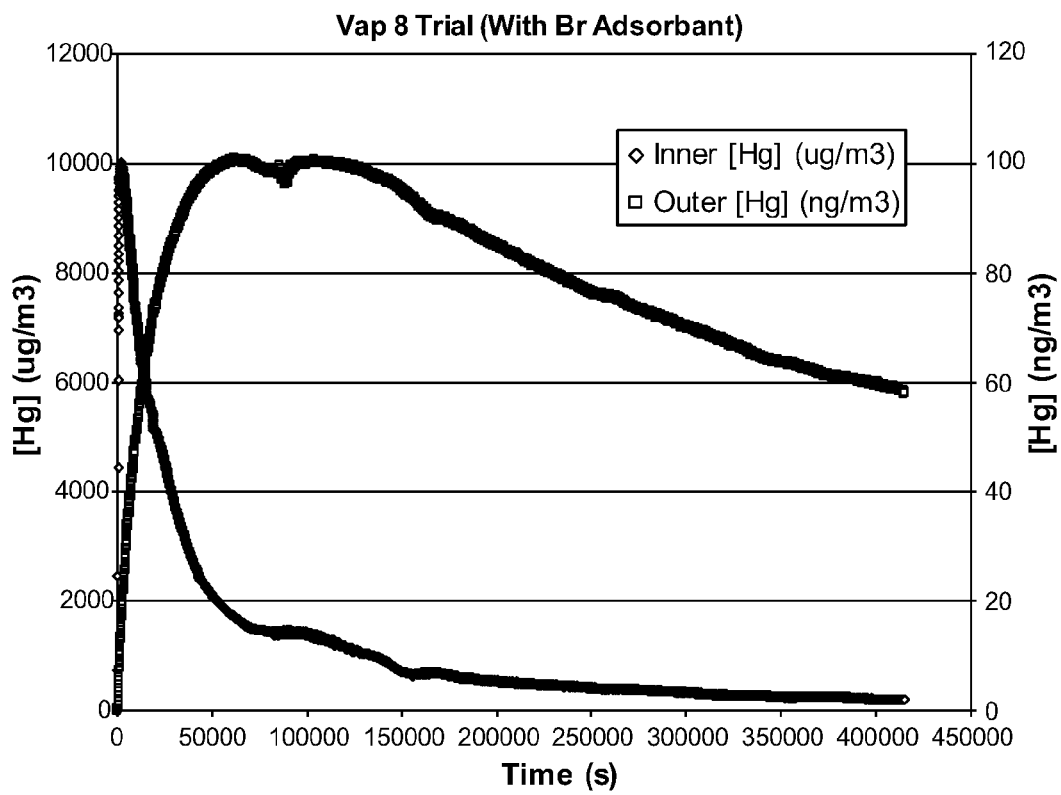
FIG. 11 plots Hg concentration ($\mu g/m^3$) versus time (sec) for a carbon pad impregnated with Br adsorbent inside and outside the fluorescent lamp container.

FIG. 11 shows what happens when the experiment is repeated with a Br Adsorbent (see Example 1 for details) placed inside the inner box. The Br is doing its job. However, as demonstrated in Example 1, the disclosed the $KI_3$ reacted S combination would display superior results than those reported in this example.

Example 3

Figure 12:
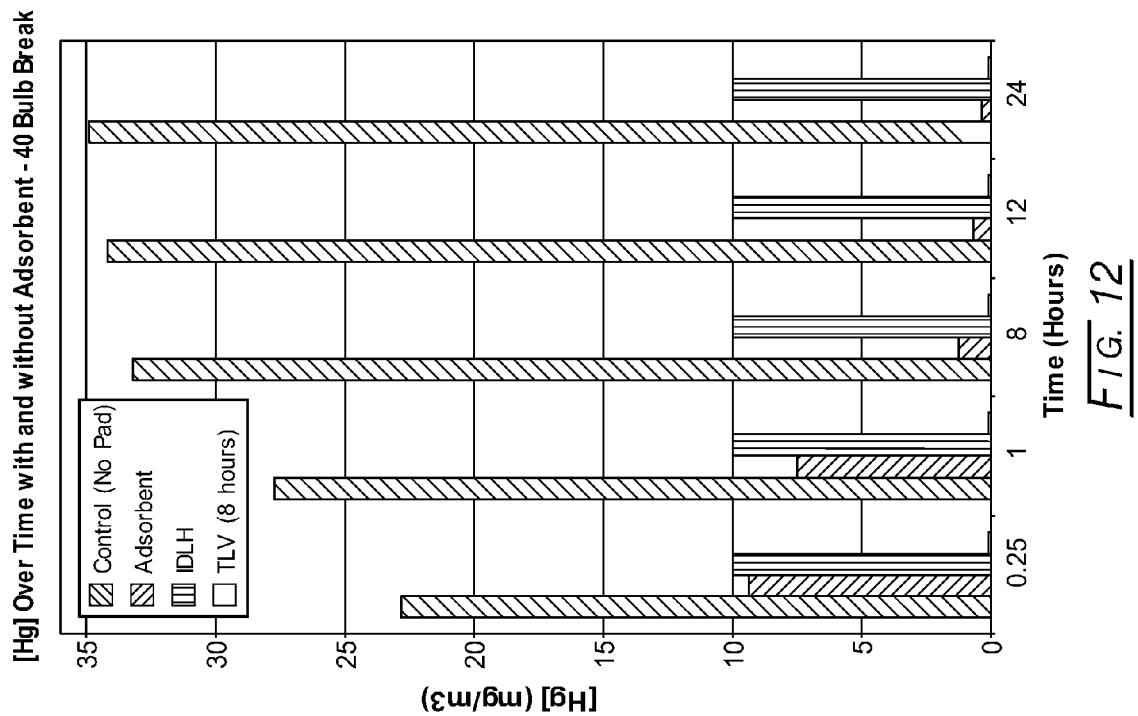
FIG. 12 is a bar graph over time of Hg concentration ($mg/m^3$) for a 40-bulb break testing the disclosed $KI_3$/S compound.
Figure 14:
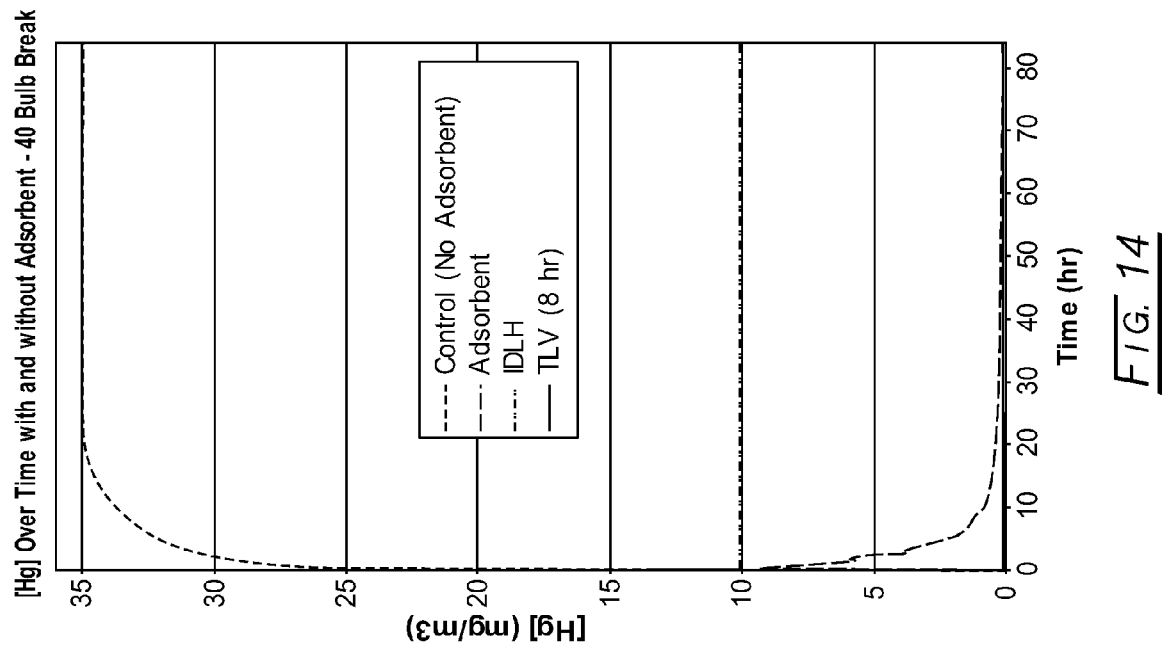
FIG. 14 plots the 40-bulb break of FIG. 13 over time from 0 to 80 hours post break without adsorbent being present.
Figure 13:
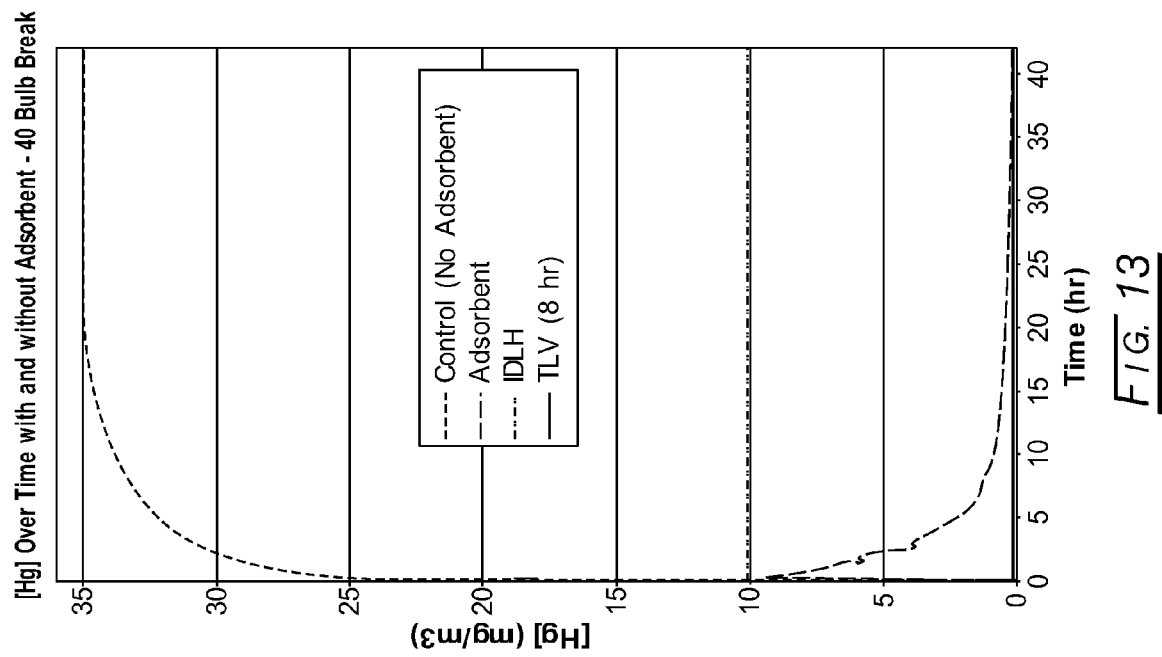
FIG. 13 plots the 40-bulb break of FIG. 13 over time from 0 to 40 hours post break with adsorbent being present.

In this example, the LampTracker® Mercury Vapor Lok® inner foil/polybag assembly, as described in the '758 patent, had 40 of the 1.2 m (4 ft) standard fluorescent lamps placed in the bag. The inner box has two 12.5 cm×25.4 cm (5 in×10 in) cloths with 0.105 g/cm$^2$ of carbon impregnated with the $KI_3$ reacted S combination adhesively affixed to the 2 inside flaps on one of the inner box. FIGS. 12-14 display the results recorded. Note that the results also report a control (no pad), the NIOSH (IDLH) level (immediately dangerous to life and health), and OSHA TLV at 8 hours.

FIG. 13 shows the amount of Hg (mg/m$^3$) from the 40-tube break over time up to 40 hours. The adsorbent reduces the Hg gradually over time. FIG. 14 graphically displays the same results up to 80 hours post the 40-tube break. Again, the adsorbent is shown to be effective in scavenging Hg.

While the device and method has been described with reference to various embodiments, those skilled in the art will understand that various changes may be made and equivalents may be substituted for elements thereof without departing from the scope and essence of the disclosure. In addition, many modifications may be made to adapt a particular situation or material to the teachings of the disclosure without departing from the essential scope thereof. Therefore, it is intended that the disclosure not be limited to the particular embodiments disclosed, but that the disclosure will include all embodiments falling within the scope of the appended claims. In this application, all units are in the metric system and all amounts and percentages are by weight, unless otherwise expressly indicated. Also, all citations referred herein are expressly incorporated herein by reference.

We claim:

1. A method for scouring released Hg housed within a container, which comprises the steps of:
 (a) providing a source of carbon carrying between about 5% and 15% sulfur, basis carbon weight, reacted with between about 0.02 to about 1% by weight iodine, basis sulfur weight; and
 (b) placing within said container a substrate bearing an effective amount of said source of carbon carrying said iodine reacted sulfur for scouring Hg released within said container.

2. The method of step 1, wherein said substrate is impregnated with between about 0.08 and 0.23 g/cm$^2$ carbon carrying said iodine reacted sulfur.

3. The method of claim 1, wherein a source of said released Hg comprises fluorescent lamps.

4. The method of claim 1, wherein said iodine is provided as $I_2$, $KI_3$, or ICl.

5. The method of claim 4, wherein said iodine is provided as $I_2$.

6. The method of claim 1, wherein said impregnated substrate is chemically or mechanically secured to said container.

7. The method of claim 1, where in said substrate comprises woven or non-woven fibrous material.

8. The method of claim 7, wherein said fibrous material is one or more of polymeric fiber or cotton fiber.

9. The method of claim 7, wherein said woven or non-woven fibrous material has an open structure.

10. The method of claim 1, wherein at least about 95% of said carbon has a particle size of less than 45 μm.

* * * * *